US012705604B2

(12) United States Patent
Araujo et al.

(10) Patent No.: US 12,705,604 B2
(45) Date of Patent: Aug. 11, 2026

(54) SECURE PAYMENT FLOW USING AN LLM AGENT WITH A SINGLE USE ACCESS TOKEN AND AN ON-DEVICE WALLET

(71) Applicant: MASTERCARD INTERNATIONAL INCORPORATED, Purchase, NY (US)

(72) Inventors: Alonso Araujo, New York, NY (US); Rahmana Muhammad, Brooklyn, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 27 days.

(21) Appl. No.: 18/789,633

(22) Filed: Jul. 30, 2024

(65) Prior Publication Data

US 2025/0045735 A1 Feb. 6, 2025

Related U.S. Application Data

(60) Provisional application No. 63/517,571, filed on Aug. 3, 2023.

(51) Int. Cl.
*G06Q 20/36* (2012.01)
*G06Q 50/14* (2012.01)

(52) U.S. Cl.
CPC ......... *G06Q 20/3674* (2013.01); *G06Q 50/14* (2013.01)

(58) Field of Classification Search
CPC .... G06Q 20/3674; G06Q 20/12; G06Q 20/36; G06Q 20/42; G06Q 50/14; G06Q 10/02;
(Continued)

(56) References Cited

U.S. PATENT DOCUMENTS 10,992,605 B2 * 4/2021 Agarwal ................. H04W 4/12
2021/0075748 A1 3/2021 Agarwal et al.
(Continued)

FOREIGN PATENT DOCUMENTS

KR 10-2021-0087321 A 7/2021
KR 20210087321 A * 7/2021 ........... G06F 16/955
KR 102476830 B1 * 12/2022 ........... H04N 13/361

OTHER PUBLICATIONS

O'Leary, Daniel E., Massive Data Language Models and Conversational AI: Emerging Issues (Aug. 12, 2022). (Year: 2022).*
(Continued)

*Primary Examiner* — Jalatee Worjloh
(74) *Attorney, Agent, or Firm* — Barta Jones, PLLC

(57) ABSTRACT

A computerized method for integrating a conversational agent with a payment application programming interface (API) is provided. A large language model (LLM) custom agent receives a request to book a travel itinerary. The user is prompted, in a user interface of the conversational agent, to authorize one-time permission to access a digital wallet associated with the user. Upon receiving the one-time permission to access the digital wallet, the travel itinerary comprising the plurality of bookings is provided to the user. If a confirmation to book the travel itinerary is received, the LLM custom agent books, using the payment API and the digital wallet associated with the user, the provided travel itinerary comprising the plurality of bookings. A confirmation of booking the provided travel itinerary is provided in the user interface of the conversational agent.

20 Claims, 7 Drawing Sheets

(58) Field of Classification Search
CPC ............. G06Q 10/025; G06Q 30/0613; G06Q 30/0619; G06N 3/006
See application file for complete search history.

(56) References Cited

U.S. PATENT DOCUMENTS

| | | | | |
|---|---|---|---|---|
| 2021/0166160 | A1 | 6/2021 | Ptitsyn et al. | |
| 2023/0053675 | A1 | 2/2023 | Edwards et al. | |
| 2024/0005305 | A1 * | 1/2024 | Rush | G06Q 30/0242 |
| 2025/0238781 | A1 * | 7/2025 | Bodalia | G06Q 30/0633 |

OTHER PUBLICATIONS

Lee, Kang Ha, "International Search Report & Written Opinion", International Application No. PCT/US2024/039712, mailed Nov. 13, 2024, 10 pages.

* cited by examiner

300

SECURE PAYMENT FLOW USING AN LLM AGENT WITH A SINGLE USE ACCESS TOKEN AND AN ON-DEVICE WALLET

BACKGROUND

The advent of online transactions has revolutionized the way services and goods are purchased, including the travel industry, where consumers commonly book flights, hotels, and other travel-related services via the internet. Traditional methods of payment, while convenient, expose users to significant security risks such as data breaches, identity theft, and unauthorized transactions. Several measures have been implemented to mitigate these risks, including the use of encryption, two-factor authentication, and secure payment gateways. However, these measures are not foolproof and can be cumbersome for the user. For example, every time an application is used to book a travel itinerary, a wide range of personal data (e.g., calendar, preferences, etc.) is collected and shared with the application provider. While users may appreciate the data-enabled convenience and personalization offered by such applications, existing solutions are not sufficient to safeguard their privacy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for integrating a conversational agent with a payment application programming interface (API) is provided. A large language model (LLM) custom agent receives a request to book a travel itinerary comprising a plurality of bookings from a user. Upon receiving the request, the user is prompted, in a user interface of the conversational agent, to authorize one-time permission to access a digital wallet associated with the user. Upon receiving the one-time permission to access the digital wallet, the travel itinerary comprising the plurality of bookings is provided to the user. If a confirmation to book the travel itinerary is received, the LLM custom agent books, via the payment API, the provided travel itinerary comprising the plurality of bookings using the digital wallet associated with the user. A confirmation of booking the provided travel itinerary is provided in the user interface of the conversational agent.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 5, the systems are illustrated as schematic drawings. The drawings may not be to scale. Any of the figures may be combined into a single example or embodiment.

DETAILED DESCRIPTION

Figure 1:
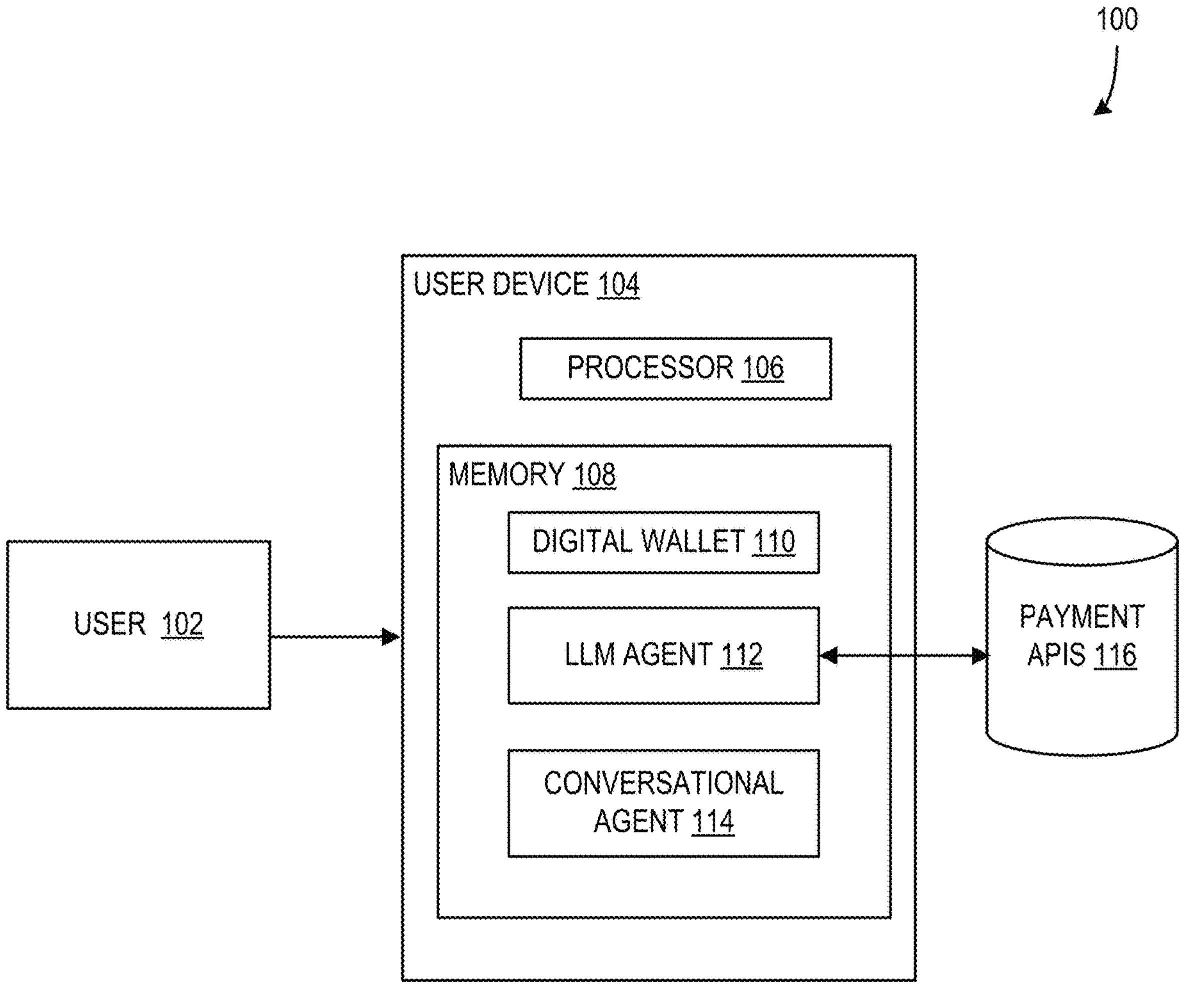
FIG. 1 is a block diagram illustrating an example system configured for integrating a conversational agent and a payment API.

Organizing a trip can often feel like assembling an elaborate jigsaw puzzle, requiring travelers to piece together a myriad of components across time zones and currencies. Artificial intelligence (AI) facilitated automation, however, can simplify the process. Through the integration of a conversational interface with an array of travel platforms e.g., those of airlines, hospitality providers, and transportation services planning a trip is reduceable to a brief command such as, "Organize a vacation to an Italian coastal village like Positano, but with fewer crowds and within my budget." Moreover, AI is equipped to deliver astute price predictions, giving travelers critical insights into airline fare trends, thereby ensuring that the travelers are offered optimal deals. For example, a voice interface employed on a travel booking platform can provide an AI-crafted itinerary with confirmed accommodations, transportation bookings and dining reservations tailored to the traveler's preferences. Generative AI transcends the limitations of logistics and planning; it can synthesize immersive videos that offer glimpses into travelers' impending adventures. Utilizing cutting-edge technologies, individuals can conduct virtual surveys of their journeys, ensuring thorough preparation and heightening anticipation.

In such a context, aspects of the disclosure enable a large learning model (LLM) custom agent to integrate a conversational agent (such as ChatGPT™) with a payment application programming interface (API). The LLM custom agent receives from a user a request to book a travel itinerary comprising a plurality of bookings. For example, a plurality of bookings in the travel itinerary include bookings for travel (e.g., airline reservation from a source to a destination location), stay (e.g., hotel stay at the destination), and/or dining services (e.g., table reservation for lunch or dinner), etc. In some examples, the LLM custom agent receives the request to book the travel itinerary via the conversational agent. In some examples, the request to book the travel itinerary is for one booking (e.g., one or more of the bookings for travel, stay, and/or dining services etc.) instead of a plurality of bookings. In some other examples, the LLM custom agent directly receives the request to book the travel itinerary from the user. In such examples, the LLM custom agent invokes a user interface of the conversational agent for further interaction with the user.

In some examples, the LLM custom agent is a multi-modal model. The multi-modal model combines the strengths of natural language processing (NLP) and computer vision to understand the complex, diverse, and unstructured data that may be obtained from distinct sources.

Upon receiving the request to book the travel itinerary, the user is prompted, in a user interface of the conversational agent, to authorize one-time permission to access a digital wallet associated with the user. In some examples, the one-time permission is a single use access token to access the digital wallet on a user device associated with the user. Use of the single use access token may be valid for the current session of the LLM custom agent (or the conversational agent) or it may be time bound (e.g., to be used within 5 minutes) for making a financial transaction using the digital wallet of the user.

In some examples, an application associated with the digital wallet of the user is invoked and the user is prompted in a user interface of the application associated with the digital wallet to authorize one-time permission to access the digital wallet associated with the user by the LLM custom agent. The prompt to authorize one-time permission to access the digital wallet associated with the user may include an estimated cost to book the travel itinerary for the user.

If the user grants one-time permission to access the digital wallet of the user, the LLM custom agent provides the travel itinerary including the plurality of bookings to the user. In some examples, the one-time permission to access the digital wallet of the user includes permission to access user preferences including preferred departure time (e.g., the user has a meeting in the afternoon and/or the user prefers to travel in the evening), airline (e.g., user may have accumulated frequent flyer miles), hotel (e.g., user may prefer to stay at a particular category of hotel), cuisine (e.g., at a restaurant near to the hotel and/or user preference for a particular cuisine), credit card information (e.g., making use of a credit card offer for a particular hotel), budget (e.g., budget of the user for this travel), status of the user (e.g., with a particular car rental agency), etc. The provided travel itinerary includes booking recommendations based on the user preferences. Each of the booking recommendations includes a single recommendation with a confirmed booking only, in some examples. For example, the LLM custom agent provides a single recommendation for an airline and a single recommendation for a hotel stay instead of inundating the user with multiple options or recommendations for each booking.

If a confirmation is received to book the provided travel itinerary from the user, the LLM custom agent runs the payment API for booking the provided travel itinerary comprising the plurality of bookings using the digital wallet associated with the user.

In some examples, instead of providing a confirmation on the provided itinerary, the user requests the LLM custom agent to adjust the provided travel itinerary (comprising the plurality of bookings) to the user such that the adjustment requires at least one more booking. Based on this request to adjust the provided travel itinerary, the LLM custom agent provides an adjusted travel itinerary to the user. The adjusted travel itinerary includes the at least one more booking (which the user requested) and an adjustment of at least one of the plurality of bookings provided previously to the user. The adjustment of the at least one of the plurality of bookings provided previously to the user is necessitated by the at least one more booking requested by the user. If the user confirms the adjusted travel itinerary, the LLM custom agent runs the payment API for booking the adjusted travel itinerary comprising the plurality of bookings (including the additional booking) using the digital wallet associated with the user. In case of adjustment of the travel itinerary, another one-time permission may not be required unless the time-period for making the transaction with the earlier provided one-time permission is over.

In some examples, in response to receiving the confirmation to book the provided travel itinerary, the user is prompted about availability of a reward (e.g., reward miles) usable for booking a portion of the provided travel itinerary. If the user confirms using the reward for the booking, the LLM custom agent runs the payment API for booking the provided travel itinerary (or the adjusted travel itinerary) comprising the plurality of bookings using the reward and the digital wallet associated with the user. A confirmation of booking the provided travel itinerary is provided in the user interface of the conversational agent.

Examples of the disclosure provide a LLM custom agent that integrates with a conversational agent and a digital wallet of the user. For example, booking, by the LLM custom agent via the payment API, the provided travel itinerary comprising the plurality of bookings using the digital wallet associated with the user is performed in an efficient and secure manner without disclosing personal details of the user to a travel service provider. Further, prompting, in a user interface of the conversational agent, the user to authorize one-time permission to access a digital wallet associated with the user and providing, in the user interface of the conversational agent, a confirmation of booking the provided travel itinerary enable improved and efficient user interaction with the user interface.

FIG. 1 is a block diagram illustrating an example system 100 configured for integrating a conversational agent and a payment API. In some examples, the system 100 includes a user 102 interacting with a user device 104 including a processor 106 and memory 108. The memory 108 may store a digital wallet 110, a LLM custom agent 112, and a conversational agent 114. One or more of the digital wallet 110, the LLM custom agent 112, and the conversational agent 114 may be accessed by the user device 104 from a remote location where they are stored. The LLM custom agent 112 may run the payment API by fetching from a database 116 storing the payment APIs. In some examples, the database 116 having the payment APIs is stored on the user device 104 (not shown).

Figure 2A:
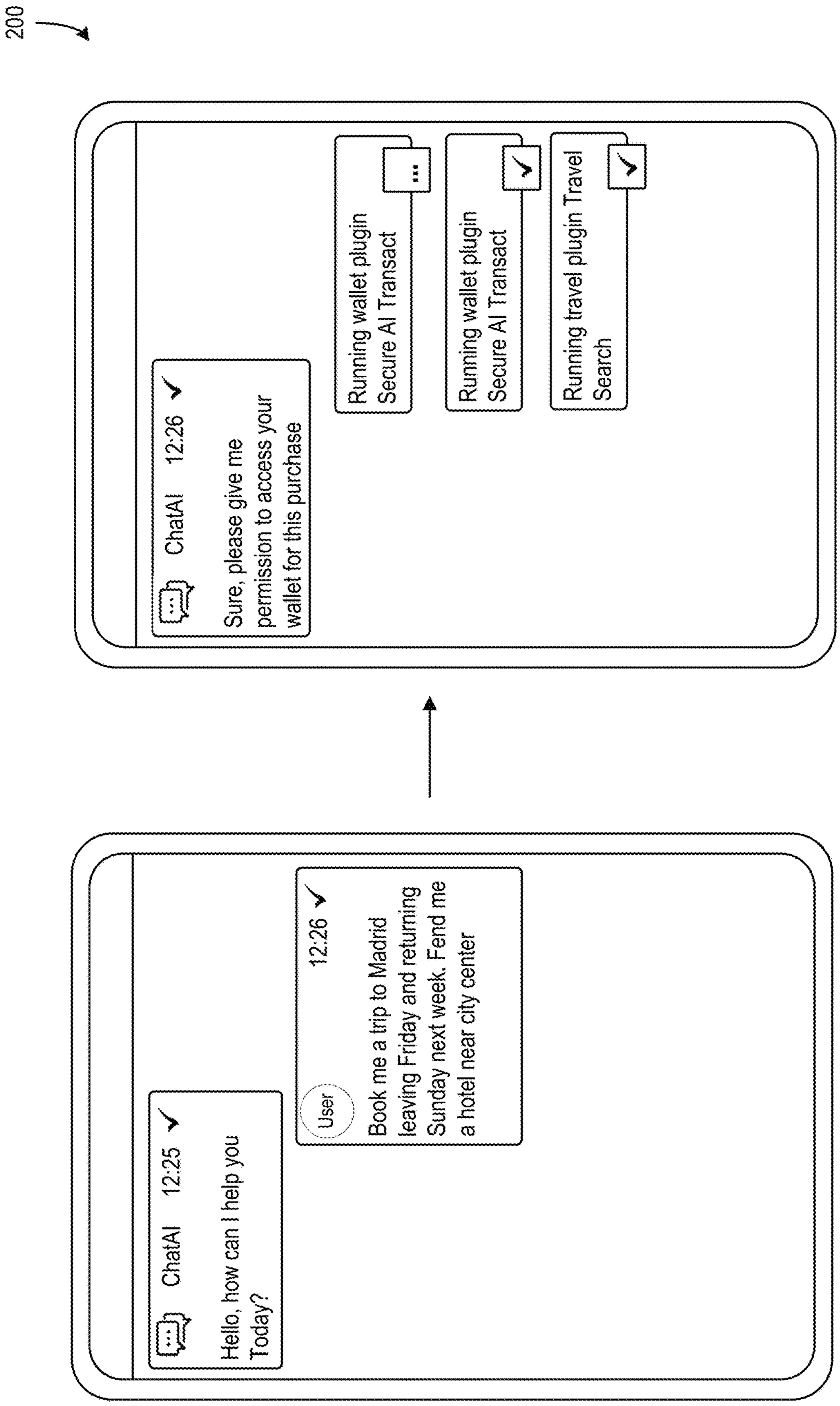
FIGS. 2A-2C illustrate a user interface of an example system configured for integrating a conversational agent and payment API.
Figure 2B:
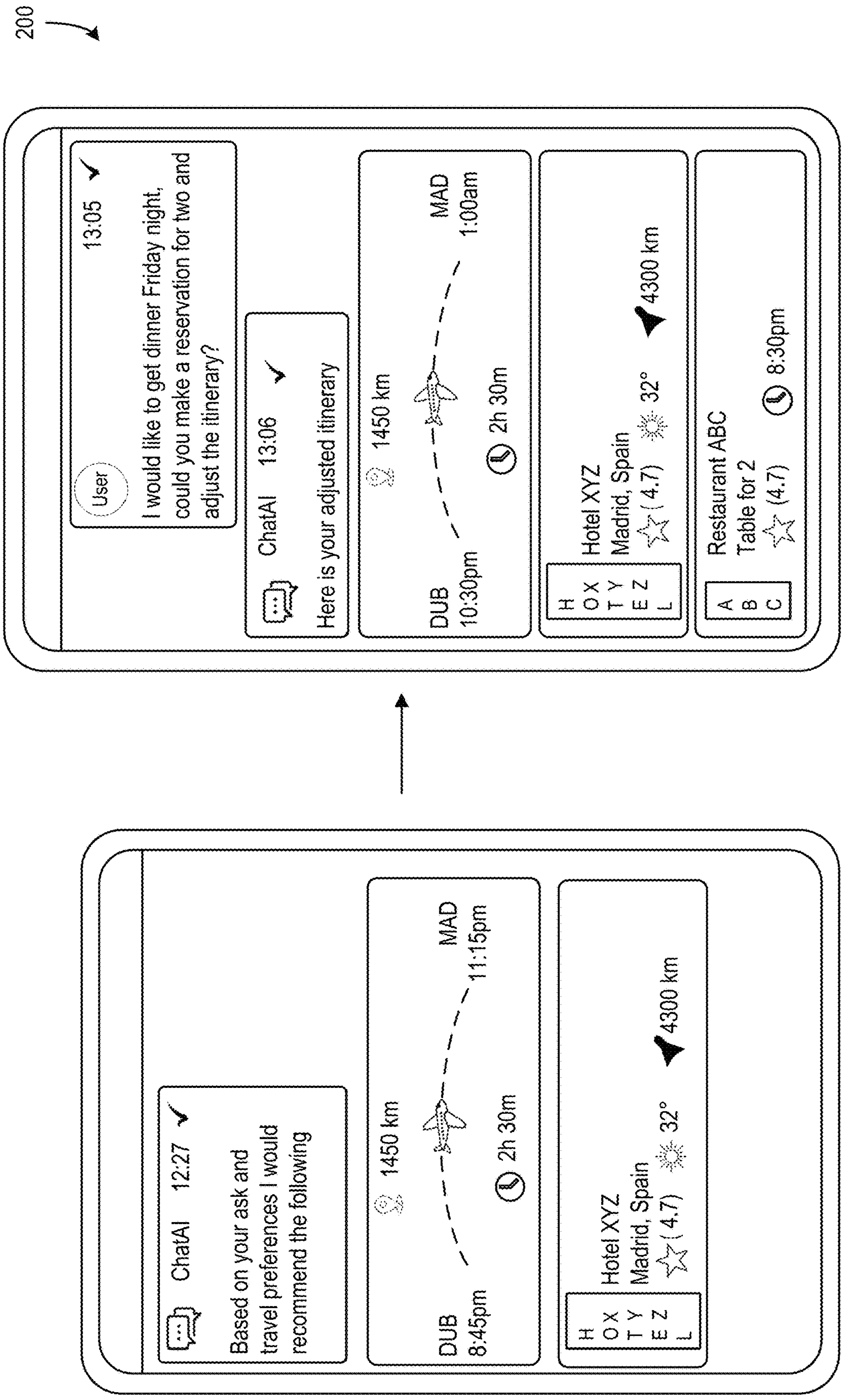
Figure 2C:
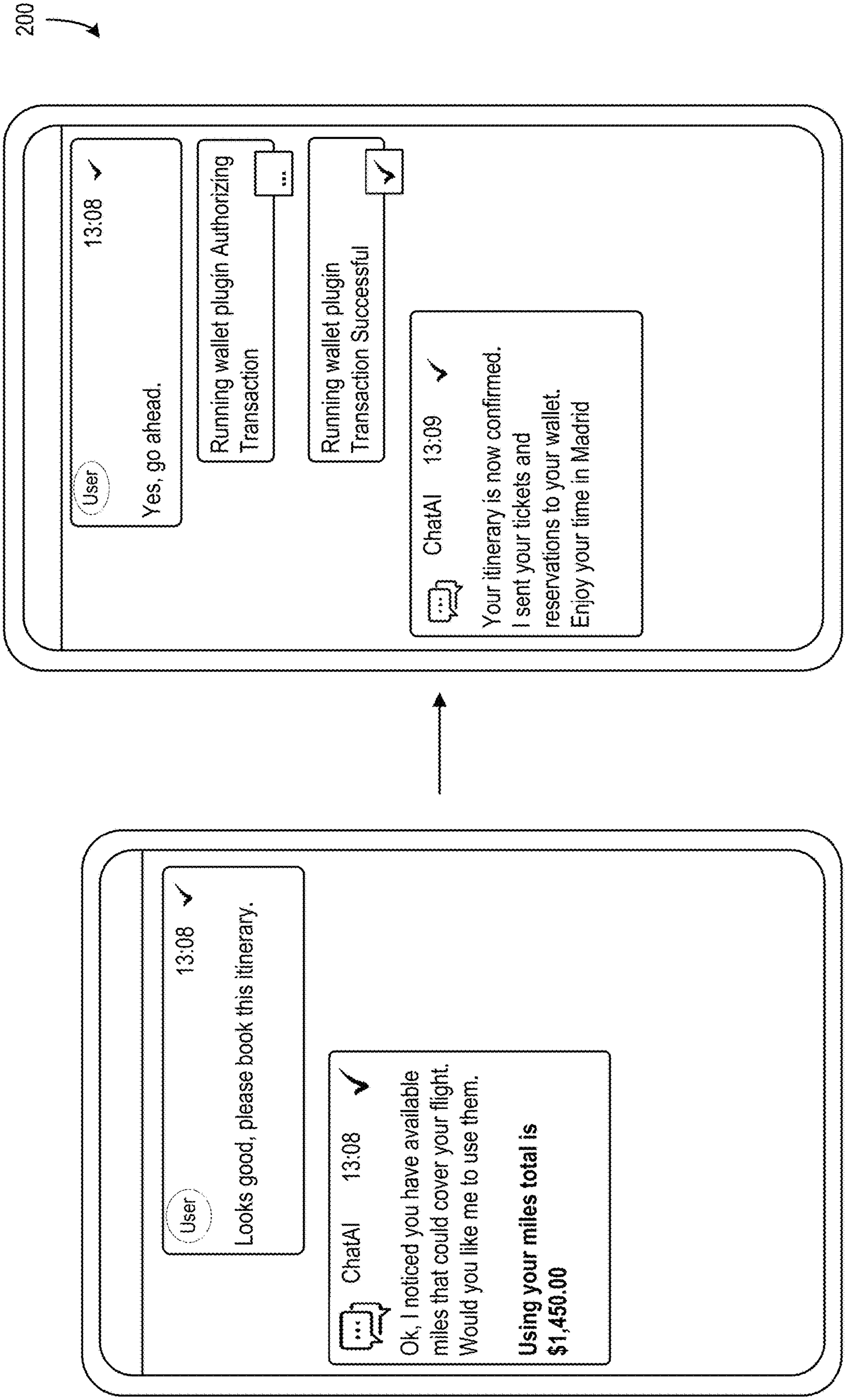

FIGS. 2A-2C illustrate a user interface 200 of an example system configured for integrating a conversational agent and payment API. Referring to FIG. 2A, the user invokes a conversational agent 114 that greets the user after which the LLM custom agent 112 receives a request to book a trip to Madrid leaving Friday and returning Sunday next week. The request may additionally ask for finding a hotel near city center. The request may be provided to the LLM custom agent 112 by the user 102 by speaking to the conversational agent 114. Based on the request, the LLM custom agent 112 runs a plugin for secure AI transaction which prompts the user to give permission to access the user's wallet for this purpose.

Figure 3:
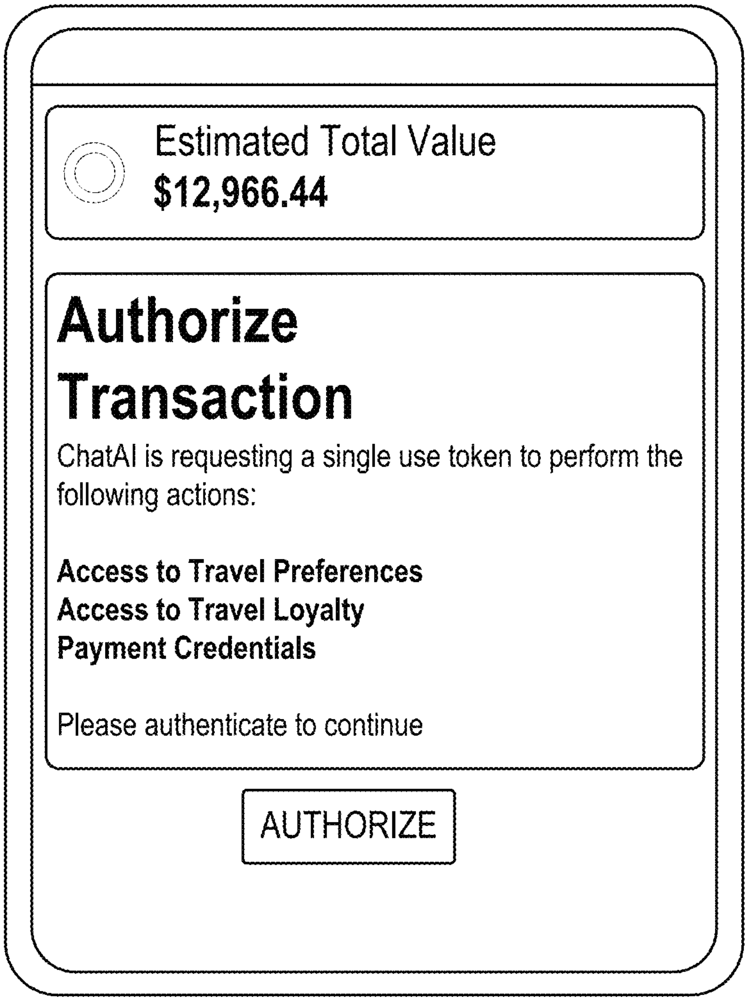
FIG. 3 illustrates an example user interface for authorizing integration of a conversational agent and payment API.

In some examples, the prompt is shown in an application associated with the user's wallet (as shown in FIG. 3). FIG. 3 illustrates a user interface 300 for authorizing integration of a conversational agent and payment API. As illustrated in FIG. 3, the user is provided with an estimated total value for the booking. The user may authorize a single use token to provide access to the LLM custom agent 112 for access to travel preferences and access to travel loyalty (e.g., accumulated rewards such as travel miles). For authorizing, the user may have to provide payment credentials to authenticate before granting access to the travel preferences and travel loyalty to the LLM custom agent 112.

In this way, integrating a single-use payment access token and an on-device digital wallet 110 with an LLM custom agent 112 creates a secure and seamless payment experience for users. The on-device digital wallet 110 provides the single-use token to the LLM custom agent 112 that uses the token to complete the transaction with a travel service provider. In particular, the single-use tokens minimize the risk of payment information theft, and on-device digital wallets add an additional layer of security (e.g., with biometric authentication). Examples of the disclosure enhance the user experience and provide a secure mechanism by which the LLM custom agent 112 handles the entire transaction process without sharing personal details of the user (e.g., preferences, calendar, etc.) with the travel service provider for booking the travel itinerary.

Returning to FIG. 2A, based on the LLM custom agent 112 receiving authorization or not receiving authorization, the plugin for secure AI transaction shows a status of the authorization (permission granted or not) in the user interface of the conversational agent 114. If the LLM custom agent 112 receives the authorization, a plugin for the travel search is run by the LLM custom agent 112. The plugin for the travel search searches for confirmed bookings available for the travel itinerary (including flight and hotel etc.) based on the user preferences and provides the results to the LLM custom agent 112.

Referring to FIG. 2B, the LLM custom agent 112 recommends bookings to the user based on the user preferences. As shown in FIG. 2B, the recommendation includes available booking details of the flight to Madrid and the hotel at Madrid. After receiving the recommendation, the user may request the LLM custom agent 112 to make an additional booking and adjust the travel itinerary accordingly. The LLM custom agent 112 may provide the adjusted travel itinerary without requesting authorization again (unless the earlier authorization is not valid or it has expired) thereby saving on processing resources and network bandwidth resources. In some examples, the adjusted travel itinerary includes the additional booking and an adjustment to the earlier provided travel itinerary to accommodate the additional booking. As illustrated in FIG. 2B, to accommodate the additional booking (e.g., for dinner), the earlier provided flight recommendation is updated (e.g., departure time is changed from 8:45 pm to 10:30 am).

Referring to FIG. 2C, if the user confirms to book the recommended travel itinerary, the LLM custom agent 112 asks if the user would like to redeem a reward (e.g., available miles) available to the user based on earlier granted permission to access the travel loyalty of the user. If the user indicates to redeem the reward, the LLM custom agent 112 executes the plugin for a secure AI transaction which shows a running status of authorizing the transaction, and then updates upon successful completion of the transaction. The LLM custom agent 112 confirms the travel itinerary and indicates that the tickets and reservation have been sent to the wallet. The LLM custom agent 112 may, additionally or alternatively, send the tickets and reservation details to the user via e-mail and/or SMS.

Figure 4:
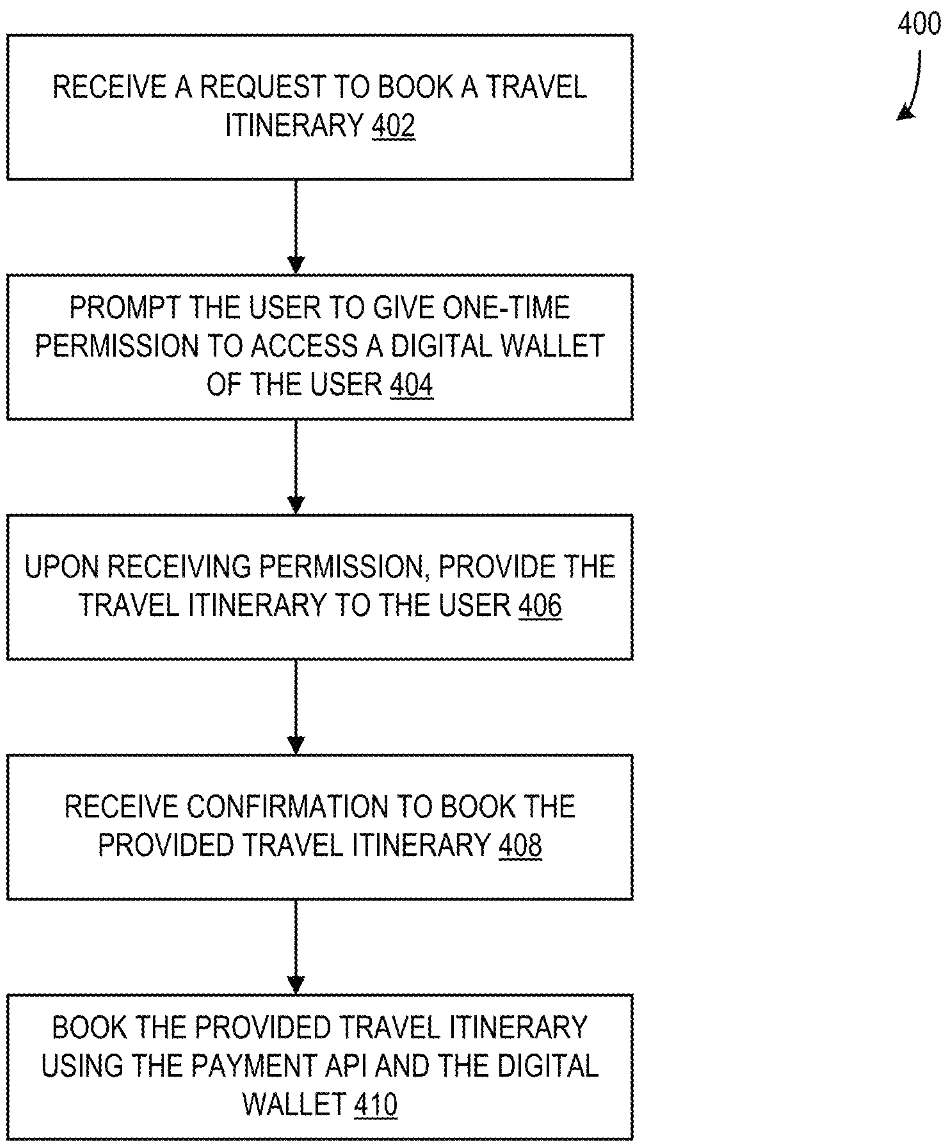
FIG. 4 is a flowchart illustrating an example method for integrating a conversational agent and a payment API.

FIG. 4 is a flowchart illustrating an example method 400 for integrating a conversational agent and a payment API. At 402, a request is received by the LLM custom agent 112 from a user 102 to book a travel itinerary comprising a plurality of bookings. The plurality of bookings may be with different providers (e.g., the flight booking and the hotel booking may be provided by different providers). At 404, the LLM custom agent 112 may prompt the user 102 to give one-time permission to access a digital wallet associated with the user 102. At 406, upon receiving the permission, the LLM custom agent 112 provides the travel itinerary to the user 102. At 408, a confirmation is received to book the provided travel itinerary. At 410, the LLM custom agent 112 uses the payment API for booking the provided travel itinerary using the digital wallet.

In some examples, an output of running the payment API is provided within the user interface of the conversational agent 114. In some examples, the LLM custom agent 112 synthesizes, using generative AI, an immersive video. The immersive video offers glimpses into impending adventures for the user 102 during the travel itinerary. For example, the immersive video may be about a tour of a museum. The immersive video may be provided within the user interface of the conversational agent 114.

In some examples, the LLM custom agent 112 receives a request to book a travel itinerary comprising a plurality of bookings from a user 102. The request may be received by the LLM custom agent 112 via a user interface of a conversational agent 114 or directly within a user interface of the LLM custom agent 112. Upon receiving the request, the user 102 is prompted to authorize a one-time access token for a digital wallet 110 associated with the user using a payment API. In some examples, the user is prompted to authorize the one-time access token for the digital wallet 110 within a user interface of an application associated with the digital wallet 110 of the user using the payment API. In some other examples, the user is prompted to authorize the one-time access token for the digital wallet 110 within the user interface of the LLM custom agent 112 using the payment API.

The one-time access token for the digital wallet 110 generated using the payment API is received by the LLM custom agent 112 upon authorization by the user. The travel itinerary comprising the plurality of bookings is obtained by the LLM custom agent 112 from a travel service provider and the travel itinerary is provided in the user interface of the LLM custom agent 112. If a confirmation is received by the LLM custom agent 112 from the user to book the provided travel itinerary, the LLM custom agent 112 books the provided travel itinerary comprising the plurality of bookings with the travel service provider using the one-time access token. In some examples, the confirmation to book the provided travel itinerary is received by the LLM custom agent 112 via a conversational agent 114. A confirmation of booking the provided travel itinerary is provided in the user interface of the LLM custom agent 112.

In this way, examples of the disclosure enhance security of the personal information of the user 102 as no personal information of the user 102 is shared with the travel service provider and only the one-time access token for the digital wallet 110 is shared outside a user device 104 of the user 102.

Based on booking the provided travel itinerary, an immersive video offering glimpses into impending adventures for the user is synthesized using generative artificial intelligence (AI). The immersive video is provided within the user interface of the LLM custom agent 112 or an application on a user device 104 of the user 102. The LLM custom agent 112 determines capabilities of a plurality of applications available on the user device 104 to play the immersive video and selects the application amongst the plurality of applications based on their capabilities to play the immersive video. The LLM custom agent 112 auto-plays the immersive video in the application without any user input, thereby enhancing user experience.

In some examples, the user is prompted by the LLM custom agent 112 about availability of a reward usable for booking a portion of the provided travel itinerary in response to receiving the confirmation to book the provided travel itinerary. If a confirmation to use the reward for booking is received, a modified one-time access token for the digital wallet is received by the LLM custom agent 112. The modified one-time access token may be generated by modifying the one-time access token to include the confirmation to use the reward for booking in addition to authorizing using the digital wallet 110 for the booking. The modified one-time access token is used by the LLM custom agent 112 for booking the provided travel itinerary comprising the plurality of bookings.

In some examples, the LLM custom agent 112 receives a request to book a travel itinerary comprising a plurality of bookings via a conversational agent 114 from a user 102. Upon receiving the request, the user 102 is prompted to authorize a one-time access token for a digital wallet 110 associated with the user using a payment API. The LLM custom agent 112 and the digital wallet 110 interact on a user device 104 of the user 102 using the payment API obtained from database 116. In some examples, the user is prompted to authorize the one-time access token for the digital wallet 110 within a user interface of an application associated with the digital wallet 110 of the user using the payment API. In some other examples, the user is prompted to authorize the one-time access token for the digital wallet 110 within the user interface of the conversational agent 114 using the payment API.

The one-time access token for the digital wallet 110 generated using the payment API is received by the LLM custom agent 112 upon authorization by the user 102. The travel itinerary comprising the plurality of bookings is obtained by the LLM custom agent 112 from a travel service provider and the travel itinerary is provided in the user interface of the conversational agent 114. If a confirmation is received by the LLM custom agent 112 from the user 102 to book the provided travel itinerary, the LLM custom agent 112 books the provided travel itinerary comprising the plurality of bookings with the travel service provider using the one-time access token. A confirmation of booking the provided travel itinerary is provided in the user interface of the conversational agent 114.

Example functionality of the LLM custom agent 112 (also called the travel assistant) is discussed below:

The travel assistant is a helpful assistant that helps its users book a flight. The travel assistant replies using a JSON format.

The travel assistant discusses:

The flight details

Access to the user's digital wallet, which contains the user's payment methods, travel preferences and personal information like location Confirmation to process tickets and payment Rules:

The travel assistant only needs to request wallet access once

The travel assistant can only talk about travel, no other topics are allowed. The travel assistant rejects politely if the user tries to talk about a different topic.

The travel assistant uses the user's digital wallet to pay for the flight. The travel assistant doesn't need to confirm the payment method.

In some examples, the travel assistant replies to messages using the JSON format below.

```
{
"assistantResponse": "Hello, how can I help you today?", // This is where the travel
assistant puts a response to the user messages.
"shareItinerary": true, // This attribute is used to determine if the travel assistant has all
details needed to send back the flight itinerary, and that it is appropriate to send
(updated) flight itinerary at this time
"requestWalletAccess": false, // This is true after requesting wallet access. This will
start a wallet access flow for the user.
"processingPurchase": false, // This is true when the travel assistant wants to process
the payment
"purchaseCompleteCheckpoint": false, // This is true for the moment after a payment is
processed
"userTravelProfile": null // This is populated when the travel assistant gets access to
user wallet
"itinerary": { // This object is used to present to the user the itinerary details. The travel
assistant replies with only one flight.
"flight": {
"departAirport": "DUB",
"departTime": "8:45pm",
"flightDistance": "1450 km",
"flightLength": "2h 30m",
"arrivalAirport": "MAD",
"arrivalTime": "11:15pm"
}
}
```

In some examples, the user preferences are generated by combining data from multiple sources, like airtime usage, mobile money transfers, geolocation, bill payment history, and social media etc. Through consent management, consumers decide which data they want to share. Very basic consent management exists today as most consumers are aware of lengthy terms and conditions that detail a company's data practices. However, sophisticated consent management tools make this a more dynamic, interactive experience: shifting from overly detailed disclaimers towards simpler, more concise, user-friendly language. Multi-level permissioning is the next stage of consent management and gives individuals more control over how third parties use their data. Consent management also plays a key role in open banking ecosystems where open APIs (such as the payment APIs in database 116) enable third-party developers to build applications and services around financial institutions.

In some examples, the user preferences are anonymized before sharing with the LLM custom agent 112 to protect and conceal an individual's data. Using algorithms, aspects of the disclosure make predictions and recommendations while retaining a user's anonymity.

Aspects of the disclosure implement on-device AI, which moves intelligence to smart devices (phones, automobiles, watches, speakers, etc.) at the edge of a given network. By providing AI functionality directly on-device, the risk to personal data is limited since it does not extract information from the user to a location outside of their control. Another aspect is to train AI on the devices themselves—known as federated learning. This approach allows edge devices to learn collaboratively within a shared framework while keeping all the training data on the device, providing additional confidence to data subjects that their data will not be transmitted.

Exemplary Operating Environment

Figure 5:
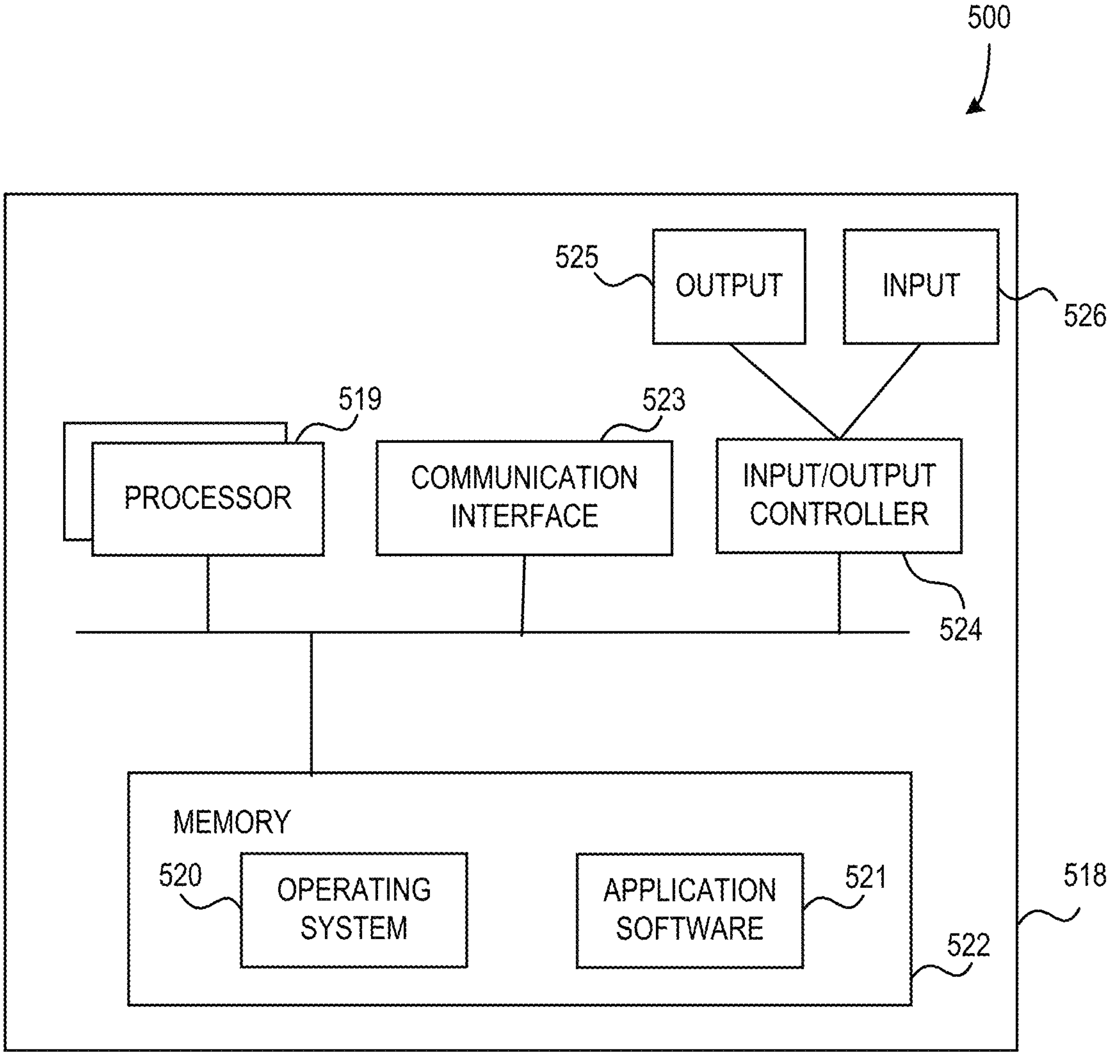
FIG. 5 illustrates an example computing apparatus as a functional block diagram.

The present disclosure is operable with a computing apparatus according to an embodiment as a functional block diagram 500 in FIG. 5. In an example, components of a computing apparatus 518 are implemented as a part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hard-coded machine. In some examples, platform software comprising an operating system 520 or any other suitable platform software is provided on the apparatus 518 to enable application software 521 to be executed on the device. In some examples, integrating a conversational agent and a payment API as described herein is accomplished by software, hardware, and/or firmware.

In some examples, computer executable instructions are provided using any computer-readable media that is accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium does not include any form of propagating signal. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or a speaker, which are separate from or integral to the electronic device. Additionally, or alternatively, the input/output controller 524 is configured to receive and process an input from one or more input devices 526, for example, a keyboard, a microphone, or a touchpad. In one example, the output device 525 also acts as the input device. An example of such a device is a touch sensitive display. The input/output controller 524 may also output data to devices other than the output device, e.g., a locally connected printing device. In some examples, a user provides input to the input device(s) 526 and/or receives output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computerized method for integrating a conversational agent with a payment application programming interface (API) comprises: receiving, by a large language model (LLM) custom agent from a user, a request to book a travel itinerary comprising a plurality of bookings; upon receiving the request, prompting, in a user interface of the conversational agent, the user to authorize one-time permission to access a digital wallet associated with the user; upon receiving the one-time permission to access the digital wallet, providing the travel itinerary comprising the plurality of bookings to the user; receiving a confirmation to book the provided travel itinerary; running, by the LLM custom agent, the payment API for booking the provided travel itinerary comprising the plurality of bookings using the digital wallet associated with the user; and providing, in the user interface of the conversational agent, a confirmation of booking the provided travel itinerary.

An example system comprises: a processor; and a memory storing instructions that upon execution by the processor perform operations comprising: receiving, by a large language model (LLM) custom agent from a user, a request to book a travel itinerary comprising a plurality of bookings; upon receiving the request, prompting the user to authorize a one-time access token for a digital wallet associated with the user using a payment application programming interface (API); receiving, by the LLM custom agent, the one-time access token for the digital wallet generated using the payment API; providing, in a user interface of the LLM custom agent, the travel itinerary comprising the plurality of bookings obtained from a travel service provider; receiving, by the LLM custom agent, a confirmation from the user to book the provided travel itinerary; booking, by the LLM custom agent using the one-time access token, the provided travel itinerary comprising the plurality of bookings with the travel service provider; and providing, in the user interface of the LLM custom agent, a confirmation of booking the provided travel itinerary.

An example computer storage medium stores instructions that upon execution by a processor perform operations comprising: receiving, by a large language model (LLM) custom agent via a conversational agent from a user, a request to book a travel itinerary comprising a plurality of bookings; upon receiving the request, prompting the user to authorize a one-time access token for a digital wallet associated with the user using a payment application programming interface (API); receiving, by the LLM custom agent, the one-time access token for the digital wallet generated using the payment API; providing, in a user interface of the conversational agent, the travel itinerary comprising the plurality of bookings obtained from a travel service provider; receiving, by the LLM custom agent, a confirmation from the user to book the provided travel itinerary; booking, by the LLM custom agent using the one-time access token, the provided travel itinerary comprising the plurality of bookings with the travel service provider; and providing, in the user interface of the conversational agent, a confirmation of booking the provided travel itinerary.

Alternatively, or in addition to the other examples described herein, examples include any combination of the following:

receiving another request to adjust the provided travel itinerary comprising the plurality of bookings to the user, the adjustment requiring at least one more booking; and providing an adjusted travel itinerary to the user, the adjusted travel itinerary comprising the at least one more booking and an adjustment of at least one of the plurality of bookings provided previously to the user.

in response to receiving the confirmation to book the provided travel itinerary, prompting the user about availability of a reward usable for booking a portion of the provided travel itinerary;

receiving a confirmation to use the reward for booking; and running, by the LLM custom agent, the payment API for booking the provided travel itinerary comprising the plurality of bookings using the reward and the digital wallet associated with the user.

providing an output of running the payment API within the user interface of the conversational agent.

synthesizing, using generative AI, an immersive video offering glimpses into impending adventures for the user.

wherein the immersive video is provided within the user interface of the conversational agent.

wherein the provided travel itinerary comprises booking recommendations based on user preferences.

wherein each of the plurality of bookings in the provided travel itinerary comprises a single recommendation with a confirmed booking.

wherein the one-time permission comprises a single use access token to access the digital wallet on a user device associated with the user.

wherein the request to book the travel itinerary is received by the LLM custom agent via the conversational agent.

wherein one or more of the request to book the travel itinerary and the confirmation from the user to book the provided travel itinerary are received by the LLM custom agent via a conversational agent.

wherein LLM custom agent and the digital wallet interact on a user device of the user using the payment API.

in response to receiving the confirmation to book the provided travel itinerary, prompting the user about availability of a reward usable for booking a portion of the provided travel itinerary;

receiving a confirmation to use the reward for booking;

receiving a modified one-time access token for the digital wallet, the modified one-time access token being generated by modifying the one-time access token to include the confirmation to use the reward for booking; and booking, by the LLM custom agent using the modified one-time access token, the provided travel itinerary comprising the plurality of bookings.

synthesizing, using generative artificial intelligence (AI), an immersive video offering glimpses into impending adventures for the user, wherein the immersive video is provided within the user interface of the LLM custom agent or an application on a user device of the user.

wherein the LLM agent is integrated with the digital wallet and the conversational agent on a user device of the user.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for detecting fraud transactions in peer-to-peer payments without an intermediary.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized secure payment method comprising:

receiving from a user, by a large language model (LLM) custom agent on a user device, a request to book a travel itinerary comprising a plurality of bookings;

performing a secure payment for the travel itinerary comprising the plurality of bookings by at least:

upon receiving the request, prompting, in a user interface of a conversational agent on the user device, the user to authorize one-time permission for the LLM custom agent to access a digital wallet and receive therefrom a single-use payment token, wherein the digital wallet is on the user device and associated with the user;

upon receiving, via the user interface of the conversational agent on the user device, the one-time permission to access the digital wallet, providing the travel itinerary comprising the plurality of bookings to the user;

receiving a confirmation from the user to book the provided travel itinerary; and booking, in response to the confirmation and by the LLM custom agent via a payment application programming interface (API) that is on the user device and that engages with one or more travel service providers, the provided travel itinerary comprising the plurality of bookings using the single-use payment token, wherein no personal preference information of the user is shared with the one or more travel service providers.

2. The computerized secure payment method of claim 1, wherein the one-time permission has a time bound state within which the one-time permission is not expired followed by a subsequent state during which the one-time permission is expired, and wherein the computerized secure payment method further comprises:

receiving another request to adjust, in accordance with an adjustment, the provided travel itinerary comprising the plurality of bookings from the user, the adjustment requiring at least one more booking; and determining whether the one-time permission is not expired or expired, and providing, when the one-time permission is not expired, an adjusted travel itinerary to the user without prompting the user for another one-time permission to access the digital wallet, the adjusted travel itinerary comprising the at least one more booking and an adjustment of at least one of the plurality of bookings provided previously to the user.

3. The computerized secure payment method of claim 1, further comprising:

in response to receiving the confirmation to book the provided travel itinerary, prompting the user about availability of a reward for booking, usable for booking a portion of the provided travel itinerary;

receiving a confirmation to use the reward for booking; and running, by the LLM custom agent, the payment API for booking the provided travel itinerary comprising the plurality of bookings using the reward and the digital wallet associated with the user.

4. The computerized secure payment method of claim 1, further comprising:

providing an output of running the payment API within the user interface of the conversational agent.

5. The computerized secure payment method of claim 1, further comprising:

synthesizing, using generative artificial intelligence (AI), an immersive video offering glimpses into impending adventures for the user.

6. The computerized secure payment method of claim 5, wherein the immersive video is provided within the user interface of the conversational agent.

7. The computerized secure payment method of claim 1, wherein the provided travel itinerary comprises booking recommendations based on user preferences.

8. The computerized secure payment method of claim 1, wherein each of the plurality of bookings in the provided travel itinerary comprises a single recommendation with a confirmed booking.

9. The computerized secure payment method of claim 1, wherein the one-time permission comprises a single use access token to access the digital wallet on a user device associated with the user.

10. The computerized secure payment method of claim 1, wherein the request to book the travel itinerary is received by the LLM custom agent via the conversational agent.

11. A secure payment system comprising:

a processor; and a memory storing instructions that upon execution by the processor perform operations comprising:

receiving from a user, by a large language model (LLM) custom agent on a user device, a request to book a travel itinerary comprising a plurality of bookings;

performing a secure payment for the travel itinerary comprising the plurality of bookings by at least:

upon receiving the request, prompting, using a payment application programming interface (API), the user to authorize a one-time access token for the LLM custom agent to access a digital wallet and receive therefrom a single-use payment token, wherein the digital wallet is on the user device and associated with the user;

receiving, by the LLM custom agent, the one-time access token for the digital wallet generated using the payment API;

providing, upon receiving the one-time access token and in a user interface of the LLM custom agent, the travel itinerary comprising the plurality of bookings obtained from a travel service provider;

receiving, by the LLM custom agent, a confirmation from the user to book the provided travel itinerary; and booking, in response to said confirmation and by the LLM custom agent using the one-time access token, the provided travel itinerary comprising the plurality of bookings with the travel service provider, wherein no personal preference information of the user is shared with the travel service provider.

12. The secure payment system of claim 11, wherein one or more of: the request to book the travel itinerary and the confirmation from the user to book the provided travel itinerary, are received by the LLM custom agent via a conversational agent.

13. The secure payment system of claim 11, wherein LLM custom agent and the digital wallet interact on a user device of the user using the payment API.

14. The secure payment system of claim 11, wherein the instructions upon execution by the processor perform further operations comprising:

in response to receiving the confirmation to book the provided travel itinerary, prompting the user about availability of a reward usable for booking a portion of the provided travel itinerary;

receiving a confirmation to use the reward for booking;

receiving a modified one-time access token for the digital wallet, the modified one-time access token being generated by modifying the one-time access token to include the confirmation to use the reward for booking; and booking, by the LLM custom agent using the modified one-time access token, the provided travel itinerary comprising the plurality of bookings.

15. The secure payment system of claim 11, wherein the instructions upon execution by the processor perform further operations comprising:

synthesizing, using generative artificial intelligence (AI), an immersive video offering glimpses into impending adventures for the user, wherein the immersive video is provided within the user interface of the LLM custom agent or an application on a user device of the user.

16. A computer storage medium storing instructions that, upon execution by a processor, perform a secure payment method comprising:

receiving from a user, by a large language model (LLM) custom agent on a user device and via a conversational agent from a user, a request to book a travel itinerary comprising a plurality of bookings;

performing a secure payment for the travel itinerary comprising the plurality of bookings by at least:

upon receiving the request, prompting, using a payment application programming interface (API), the user to authorize a one-time access token for the LLM custom agent to access a digital wallet and receive therefrom a single-use payment token, wherein the digital wallet is on the user device and associated with the user;

receiving, by the LLM custom agent, the one-time access token for the digital wallet generated using the payment API;

upon receiving the one-time access token, providing, in a user interface of the conversational agent, the travel itinerary comprising the plurality of bookings obtained from a travel service provider;

receiving, by the LLM custom agent, a confirmation from the user to book the provided travel itinerary; and booking, in response to said confirmation and by the LLM custom agent using the one-time access token, the provided travel itinerary comprising the plurality of bookings with the travel service provider, wherein no personal preference information of the user is shared with the travel service provider.

17. The computer storage medium of claim 16, wherein the one-time access token has a time bound state within which the one-time access token is not expired followed by a subsequent state during which the one-time access token is expired, and wherein the instructions upon execution by the processor perform further operations comprising:

receiving another request to adjust, in accordance with an adjustment, the provided travel itinerary comprising the plurality of bookings from the user, the adjustment requiring at least one more booking; and determining whether the one-time access token is not expired or expired, and providing, when the one-time access token is not expired, an adjusted travel itinerary to the user without prompting the user for another one-time permission to access the digital wallet, the adjusted travel itinerary comprising the at least one more booking and an adjustment of at least one of the plurality of bookings provided previously to the user.

18. The computer storage medium of claim 16, wherein the instructions upon execution by the processor perform further operations comprising:

in response to receiving the confirmation to book the provided travel itinerary, prompting the user about availability of a reward usable for booking a portion of the provided travel itinerary;

receiving a confirmation to use the reward for booking;

receiving a modified one-time access token for the digital wallet, the modified one-time access token being generated by modifying the one-time access token to include the confirmation to use the reward for booking; and booking, by the LLM custom agent using the modified one-time access token, the provided travel itinerary comprising the plurality of bookings.

19. The computer storage medium of claim 16, wherein the LLM custom agent is integrated with the digital wallet and the conversational agent on the user device.

20. The computer storage medium of claim 19, wherein the instructions upon execution by the processor perform further operations comprising:

synthesizing, using generative artificial intelligence (AI), an immersive video offering glimpses into impending adventures for the user, wherein the immersive video is provided within the user interface of the conversational agent or an application on the user device.

* * * * *